United States Patent [19]

Miale et al.

[11] 4,427,786

[45] Jan. 24, 1984

[54] ACTIVATION OF HIGH SILICA ZEOLITES

[75] Inventors: Joseph N. Miale, Lawrenceville; Clarence D. Chang, Princeton, both of N.J.

[73] Assignee: Mobil Oil Corporation, New York, N.Y.

[21] Appl. No.: 355,418

[22] Filed: Mar. 8, 1982

[51] Int. Cl.$^3$ .......................... B01J 29/28; B01J 37/26
[52] U.S. Cl. ........................................ 502/61; 502/71; 502/77
[58] Field of Search .................. 252/433, 442, 455 Z; 423/328

[56] References Cited

U.S. PATENT DOCUMENTS 3,467,728  9/1969  Hevert ............................ 252/433 X
4,305,808  12/1981  Bowes et al. .................... 252/455 Z
4,350,835  9/1982  Chester et al. .................. 252/455 Z Primary Examiner—Carl F. Dees
Attorney, Agent, or Firm—Alexander J. McKillop; Michael G. Gilman; Dennis P. Santini

[57] ABSTRACT

A method for enhancing the activity of high silica zeolite, i.e. a zeolite having a silica-to-alumina ratio greater than 100, which has been synthesized from a reaction mixture containing bulky ions is disclosed which involves compositing the zeolite with a support matrix, calcining the supported zeolite, treating same with boron fluoride, hydrolyzing the boron fluoride treated supported zeolite, contacting the hydrolyzed supported zeolite with a solution of an ammonium salt and then calcining the final product in order to obtain a supported zeolite having enhanced activity.

13 Claims, No Drawings

4,427,786

ACTIVATION OF HIGH SILICA ZEOLITES

CROSS-REFERENCE TO RELATED CASES

This application is related by subject to the copending applications identified as follows:

| Ser. Number | Filing Date | Ser. Number | Filing Date |
|---|---|---|---|
| 319,175 | November 9, 1981 | 333,370 | December 22, 1981 |
| 355,419 | Herewith | 355,417 | Herewith |
| 355,416 | Herewith | 355,415 | Herewith |
| 355,414 | Herewith | 355,413 | Herewith |
| 355,446 | Herewith | 355,420 | Herewith |

BACKGROUND OF THE INVENTION

1. Field of the Invention

This invention relates to a method for enhancing the acid activity of certain high silica-containing crystalline materials which involves the steps of combining same with a support matrix of $Al_2O_3$ or $Ga_2O_3$, calcining the supported material, contacting the calcined material with boron fluoride, hydrolyzing the boron fluoride contacted material, contacting the hydrolyzed material with an ammonium salt solution, and calcining the ammonium salt solution contacted material.

2. Description of Prior Art

High silica-containing zeolites are well known in the art and it is generally accepted that the ion exchange capacity of the crystalline zeolite is directly dependent on its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites having little or substantially no aluminum, have many important properties and characteristics and a high degree of structural stability such that they have become candidates for use in various processes including catalytic processes. Materials of this type are known in the art and include high silica-containing aluminosilicates such as ZSM-5 (U.S. Pat. No. 3,702,886), ZSM-11 (U.S. Pat. No. 3,709,979), and ZSM-12 (U.S. Pat. No. 3,832,449) to mention a few.

The silica-to-alumina ratio of a given zeolite is often variable; for example, zeolite X can be synthesized with a silica-to-alumina ratio of from 2 to 3; zeolite Y from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organo silicate essentially free of aluminum and exhibiting an x-ray diffraction pattern characteristic of ZSM-5 type aluminosilicate. U.S. Pat. Nos. 4,061,724; 4,073,865 and 4,104,294 describe microporous crystalline silicas or organo silicates wherein the aluminum content present is at impurity levels.

Because of the extremely low aluminum content of these high silica-containing zeolites, their ion exchange capacity is not as great as materials with a higher aluminum content. Therefore, when these materials are contacted with an acidic solution and thereafter are processed in a conventional manner, they are not as catalytically active as their higher aluminum-containing counterparts.

The novel process of this invention permits the preparation of certain high silica-containing materials which have all the desirable properties inherently possessed by such high silica materials and, yet, have an acid activity which heretofore has only been possible to be achieved by materials having a higher aluminum content in their "as synthesized" form.

It is noted that U.S. Pat. Nos. 3,354,078 and 3,644,220 relate to treating crystalline aluminosilicates with volatile metal halides. Neither of these latter patents is, however, concerned with treatment of crystalline materials having a high silica-to-alumina mole ratio of at least 100 which have been synthesized from a forming solution containing bulky ions.

SUMMARY OF THE INVENTION

The present invention relates to a novel process for improving acid activity of certain high silica-containing crystalline zeolites which comprises the steps of incorporating the high silica-containing material, either "as synthesized" or initially ion-exchanged, with a support matrix material of $Al_2O_3$, $Ga_2O_3$ or a combination thereof, calcining the resulting supported high silica-containing material, contacting said calcined material with volatile boron fluoride in a dry environment and for a critically determined time, contacting the boron fluoride contacted material with water for hydrolysis, contacting the hydrolyzed material with an ammonium salt solution and calcining said ammonium salt solution contacted material. The resulting zeolite material exhibits enhanced Bronsted acidity and, therefore, improved acid activity toward catalysis of numerous chemical reactions, such as, for example cracking of organic, e.g. hydrocarbon, compounds.

DESCRIPTION OF SPECIFIC EMBODIMENTS

The novel process of this invention is concerned with the treatment of high silica-containing crystalline material. The expression "high silica-containing crystalline material" is intended to define a crystalline structure which has a silica-to-alumina ratio greater than 100 and more preferably greater than 500, up to and including those highly siliceous materials where the silica-to-alumina ratio is infinity or as reasonably close to infinity as practically possible. This latter group of highly siliceous materials is exemplified by U.S. Pat. Nos. 3,941,871; 4,061,724; 4,073,865 and 4,104,294 wherein the materials are prepared from reaction solutions which involve no deliberate addition of aluminum. However, trace quantities of aluminum are usually present due to the impurity of the reaction solutions. It is to be understood that the expression "high silica-containing crystalline material" also specifically includes those materials which have other metals besides silica and/or alumina associated therewith, such as boron, iron, chromium, etc. Thus, a requirement with regard to the starting materials utilized in the novel process of this invention is that they have a silica-to-alumina ratio greater than about 100 (irrespective of what other materials or metals are present in the crystal structure).

Another requirement regarding the starting materials utilized in the process of this invention is that they be synthesized from a reaction mixture containing a bulky ion source. It has been found that the novel process of this invention does not provide the abundant activity improvement to high silica-containing crystalline materials which have been synthesized with non-bulky ion soures. While not wishing to be bound by any theory of operation, nevertheless, it is believed that in order for the novel process of this invention to function in a most beneficial way, it is necessary that the boron fluoride reagent have access to the intracrystalline volume or space. Use of the bulky ion sources will generate crystalline materials having larger intracrystalline space and pore openings, thereby providing greater access for the boron fluoride reagent. On the other hand, if no such bulky ion is used in the synthesis of the material, a more dense material will result, thereby limiting action of the boron fluoride reagent substantially to the surface of the material.

Bulky ion sources to have been used in the synthesis of the starting materials to be utilized herein include onium compounds and compounds containing multiple cationic centers. The onium compounds are those having the following formula:

$$R_4M^+X^-$$

wherein R is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a quadricoordinate element (e.g. nitrogen, phosphorus, arsenic, antimony or bismuth) or a heteroatom (e.g. N, O, S, Se, P, As, etc.) in an alicyclic, heteroalicyclic or heteroaromatic structure; and X is an anion (e.g. fluoride, chloride, bromide, iodide, hydroxide, acetate, sulfate, carboxylate, etc.). When M is a heteroatom in an alicyclic, heteroalicyclic or heteroaromatic structure, such structure may be, as non-limiting examples,

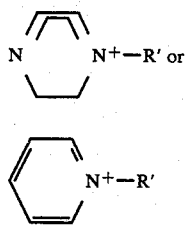

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms.

The compounds containing multiple cationic centers include those having the formula:

$$[(R)_3M^+(Z)_nM^+(R)_3](X^-)_2$$

wherein R, M and X are as above defined, Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n is a number of from 1 to about 50. Non-limiting examples of such multiple cationic center containing compounds include:

$[(CH_3)_3As^+(CH_2)_6N^+(CH_3)_3](C^-)_2$, $[(C_3H_7)_3N^+(CH_2)_{10}N^+(C_3H_7)_3](C^-)_2$, $[(C_6H_5)_3N^+(C_2H_4)_{16}P^+(C_6H_5)_3](OH^-)_2$, $[(C_{18}H_{37})_3P^+(C_2H_2)_3P^+(CH_3)_3](Cl^-)_2$, $[(C_2H_5)_3N^+(C_6H_4)N^+(C_2H_5)_3](Br^-)_2$, $[(CH_3)_3Sb^+(CH_2)_{10}Sb^+(CH_3)_3](CL^-)_2$, $[(C_6H_5)_3Sb^+(CH_2)_4N^+(CH_3)_3](OH^-)_2$, $[(CH_3)_3Bi^+(CH_2)_{18}N^+(CH_3)_3](Br^-)_2$, $[(C_2H_3)_3N^+(CH_2)_{50}N^+(C_2H_3)_3](OH^-)_2$, $[(C_6H_5)_3P^+(C_2H_2)_6As^+(CH_3)_3](Cl^-)_2$, $[(CH_3)_3N^+(CH_2)_6N^+(CH_3)_3](Cl^-)_2$, and

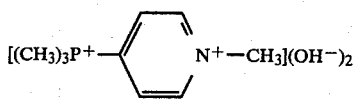

The novel process of this invention is simple and easy to carry out although the results therefrom are dramatic. The novel process of this invention is carried out by incorporating a high silica crystalline zeolite material having a silica-to-alumina ratio of at least 100, preferably at least 500, prepared from a reaction mixture containing bulky ions as above defined, with a support matrix material selected from the group consisting of alumina, gallia and a combination thereof and calcining the resulting supported high silica material by heating the same at a temperature within the range of about 200° to C. 600° C. in an atmosphere of air, nitrogen, etc. at atmospheric, superatmospheric or subatmospheric pressures for between 1 minute and 48 hours. The calcined zeolite is thereafter treated with volatile boron fluoride at a temperature of from about 0° C. to about 100° C., preferably from about ambient to about 50° C., in a dry environment. The boron fluoride treated zeolite must then be purged with dry gas (air, helium, etc.) and hydrolyzed by contact with water at a temperature of from about 20° C. to about 550° C. When the hydrolyzing temperature is below 100° C. at atmospheric pressure, liquid water may be used. When the boiling point of water is exceeded, such as when the hydrolyzing temperature exceeds 100° C. at atmospheric pressure, the zeolite may be purged with water saturated gas, e.g. helium. The hydrolyzed zeolite is then contacted with an ammonium salt solution, e.g. 1N NH$_4$NO$_3$, and thereafter calcined at a temperature of from about 200° C. to about 600° C. in an inert atmosphere of air, nitrogen, etc. at subatmospheric, atmospheric or superatmospheric pressures for from about 1 minute to about 48 hours.

The boron fluoride contacting step may be accomplished by admixture of boron fluoride or boron fluoride etherate with an inert gas such as nitrogen or helium at temperatures ranging from about 0° C. to about 100° C., preferably from about ambient to about 50° C. The amount of boron fluoride vapor which is utilized is not narrowly critical but usually from about 0.2 to about 2 grams of boron fluoride are used per gram of high silica crystalline material in the supported material.

The ammonium salt solution contacting step may be conducted with an aqueous or non-aqueous solution of an ammonium salt, e.g. NH$_4$NO$_3$, for a period of time of from about 1 hour to about 20 hours at a temperature of from ambient to about 100° C. The ammonium salt used is not narrowly critical and will normally be an inorganic salt such as ammonium nitrate, ammonium sulfate, ammonium chloride, etc.

The hydrolysis and ammonium salt solution contacting steps may be conducted simultaneously when the ammonium salt solution is aqueous. In any event, the benefits gained by the ammonium salt solution contacting step are realized subsequent to the boron fluoride contacting step and prior to final calcination.

The use of boron fluoride in the presence of siliceous materials has been avoided in the past because it is easily hydrolyzed and the HF thereby released attacks silica. We have discovered, however, that the boron fluoride contacting step of the present invention, when conducted carefully with regard to moisture content of the system and contact time, avoids the noted problem. Therefore, the boron fluoride contacting step of this invention must be carried out in a dry system after the material to be contacted has been calcined. Also, once the boron fluoride saturation point is reached in the supported material being treated, the flow of boron fluoride must be stopped and the next steps of the present method must be commenced without undue delay. The saturation point is determined by observing evolution of heat of adsorption during the boron fluoride contacting step. Saturation is indicated when the temperature of the bed of supported high silica material being contacted with the boron fluoride levels and begins to decrease.

The support matrix material combined with the high silica-containing crystalline zeolite in the initial step of the present method may be alumina and/or gallia. This matrix material may be in the form of a gel, if desired, and the relative proportion of zeolite component and support matrix material component, on an anhydrous basis, may vary with the zeolite content ranging from about 25 to about 75 weight percent of the dry composite.

Of the high silica zeolite materials advantageously treated in accordance herewith, zeolites ZSM-5 and ZSM-11 are particularly noted. ZSM-5 is described in U.S. Pat. Nos. 3,702,886 and Re 29,948, the entire contents of each being hereby incorporated by reference herein. ZSM-11 is described in U.S. Pat. No. 3,709,979, the teaching of which is incorporated herein by reference.

The activity enhanced high silica-containing crystalline materials prepared by the present process are useful as catalyst components for acid catalyzed organic compound conversion reactions. Such reactions include, as non-limiting examples, cracking of hydrocarbons, wherein the reaction conditions include a temperature of from about 300° C. to about 800° C., a pressure of from about 15 psia to about 500 psia, and a weight hourly space velocity of from about 0.1 to about 20; and conversion of methanol to gasoline wherein the reaction conditions include a temperature of from about 300° C. to about 550° C., a pressure of from about 5 psia to about 500 psia, and a weight hourly space velocity of from about 0.1 to about 100.

In practicing a particularly desired chemical conversion process, it may be useful to incorporate the above-described activity enhanced supported crystalline zeolite with additional matrix comprising another material resistant to the temperature and other conditions employed in the process. Such matrix material is useful as a binder and imparts additional resistance to the catalyst for the severe temperature, pressure and reactant feed stream velocity conditions encountered in many cracking processes.

Useful additional matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing additional matrix materials, the catalyst employed herein may be composited with an additional porous matrix material such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The additional matrix may be in the form of a cogel. The relative proportions of activity enhanced supported zeolite component and additional matrix, on an anhydrous basis, may vary widely with the zeolite content of the supported zeolite component ranging from about 1 to about 99 percent by weight and more usually in the range of about 5 to about 80 percent by weight of the total dry composite.

The following examples will illustrate the novel method of the present invention.

EXAMPLE 1

A high silica-containing ZSM-5 prepared from a reaction mixture containing tetraalkylammonium ions and having a silica-to-alumina mole ratio of about 26,000:1 (65 ppm framework alumina, 110 ppm bulk alumina and 0.23 percent sodium) was calcined for 30 minutes at 538° C. The zeolite was composited and extruded with Kaiser alumina ($Al_2O_3$) to provide an extrudate of 65 wt. % ZSM-5 and 35 wt. % $Al_2O_3$. The extrudate product of this example exhibited an Alpha Value by way of the Alpha Test hereinafter identified of 0.015.

EXAMPLE 2

A sample of low sodium zeolite ZSM-5 having a silica-to-alumina mole ratio of about 70:1 was calcined for 30 minutes at 538° C. This zeolite product exhibited an Alpha Value of 216.

EXAMPLE 3

An aliquot of extrudate of Example 1 was calcined for 30 minutes at 538° C. and saturated with $BF_3$ at ambient temperature. The sample heated up due to $BF_3$ adsorption; at the saturation point, the sample began to cool. At this point the $BF_3$ flow was stopped and the extrudate bed purged with dry air for 30 minutes. The extrudate sample was then heated at 130° F. to drive off any residual unreacted $BF_3$ and reaction moisture. The extrudate was then hydrolyzed and exchanged by three consecutive treatments with aqueous 1N $NH_4NO_3$. The extrudate sample was then washed with water, dried at 130° C. and calcined at 538° C. for 30 minutes.

EXAMPLE 4

An aliquot of extrudate from Example 1 was calcined for 30 minutes at 538° C. and, without a boron fluoride contacting step, exchanged under reflux conditions with aqueous 1N $NH_4NO_3$ for 3 hours. The calcination and exchange steps were repeated followed by a final calcination at 538° C. for 30 minutes.

EXAMPLE 5

An aliquot of ammonium exchanged extrudate product of Example 4 was treated according to the procedure set forth in Example 3.

EXAMPLE 6

An aliquot of ammonium exchanged extrudate product of Example 4 was treated according to the procedure set forth in Example 3, except that water was used in place of the $NH_4NO_3$.

EXAMPLE 7

A sample of the pure zeolite ZSM-5 used in preparation of the extrudate in Example 1, but without the compositing with alumina and extrudation, was treated by the procedure set forth in Example 3.

EXAMPLE 8

An aliquot of the low sodium zeolite of Example 2 was treated according to the procedure set forth in Example 3, except that no $NH_4NO_3$ contact was conducted.

EXAMPLE 9

An aliquot of the zeolite product of Example 8 was hydrolyzed in water for 3 hours, dried at 130° C. and then calcined at 538° C. for 30 minutes.

EXAMPLE 10

An aliquot of the zeolite product of Example 8 was treated according to the procedure set forth in Example 3.

EXAMPLE 11

A sample of zeolite ZSM-5 prepared from a reaction mixture containing tetraalkylammonium ions and having been steamed (a silica-to-alumina mole ratio of only 70:1) was composited and extruded with alumina to provide an extrudate of 65 wt. % ZSM-5 and 35 wt. % $Al_2O_3$. The product extrudate exhibited an Alpha Value of 19. This extrudate was then treated as in Example 3.

The final products of Examples 1 and 3 through 11 were subjected to the Alpha Test. Constraint Indices for the final products of Example 3, 5 and 6 were also measured. The results of these tests are listed below:

| Example | Alpha Value | Constraint Index |
|---------|-------------|------------------|
| 1  | 0.015 | — |
| 3  | 23    | 1.8 |
| 4  | 16    | — |
| 5  | 55    | 1.8 |
| 6  | 62    | 1.8 |
| 7  | 0.8   | — |
| 8  | 1.4   | — |
| 9  | 40    | — |
| 10 | 3.4   | — |
| 11 | 12    | — |

It is observed from the above results that the present method is highly useful for enhancing acid catalytic activity only for high silica zeolites, i.e., those having a silica-to-alumina mole ratio greater than 100, which have, in turn, been composited with a support matrix. These results demonstrate the effectiveness, in general, of the present method.

EXAMPLE 12

A high silica-containing zeolite is prepared from a reaction mixture containing trimethyl [6-(trimethylarsonio)hexyl] ammonium ions. A sample of the zeolite, having a silica-to-alumina mole ratio of greater than about 500, is composited with alumina as in Example 1 and treated as in Example 3. The product zeolite of this example exhibits an Alpha value of about 23.

As is known in the art, the Alpha value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1. The Alpha Test is described in U.S. Pat. No. 3,354,078 and in The Journal of Catalysis, Vol. IV, pp. 522–529 (August 1965). The Constraint Index is a measure of the selectivity of the particular catalyst and it involves conversion of normal hexane and 3-methylpentane. This test is described in many U.S. patents, including U.S. Pat. Nos. 4,231,899 and 4,288,647, and in the Journal of Catalysis, Volume 67, pp. 218–222 (1981).

What is claimed is:

1. A method for enhancing the activity of a crystalline zeolite having a silica-to-alumina mole ratio greater than about 100, wherein said zeolite has been synthesized from a reaction mixture containing bulky ions, which comprises compositing said crystalline zeolite with a support matrix material of alumina, gallia or a combination thereof, calcining the resulting supported zeolite at a temperature of from about 200° C. to about 600° C. for a period of time ranging from about 1 minute to about 48 hours, contacting said calcined supported zeolite with volatile boron fluoride in a dry environment at a temperature of from about 0° C. to about 100° C. until said supported zeolite is saturated with said boron fluoride, purging unreacted boron fluoride from said boron fluoride contacted supported zeolite, hydrolyzing said boron fluoride contacted supported zeolite, contacting said hyrolyzed supported zeolite with an ammonium salt solution and thereafter calcining said supported zeolite at a temperature of from about 200° C. to about 600° C.

2. The method of claim 1 wherein said crystalline zeolite has a silica-to-alumina mole ratio greater than about 500.

3. The method of claim 2 wherein said ammonium salt solution is ammonium nitrate.

4. The method of claim 2 wherein said crystalline zeolite is ZSM-5.

5. The method of claim 2 wherein said crystalline zeolite is ZSM-11.

6. The method of claim 1 wherein said bulky ions are provided by sources selected from the group consisting of onium compounds and compounds containing multiple cationic centers.

7. The method of claim 6 wherein said crystalline zeolite has a silica-to-alumina mole ratio greater than about 500.

8. The method of claim 6 wherein said ammonium salt solution is ammonium nitrate.

9. The method of claim 6 wherein said crystalline zeolite is ZSM-5.

10. The method of claim 6 wherein said crystalline zeolite is ZSM-11.

11. A supported zeolite composition having enhanced activity prepared by the method of claim 1, 2, 3, 4, 5, 6, 7, 8, 9 or 10.

12. The method of claim 1 wherein said volatile boron fluoride contacting is conducted at a temperature of from about ambient to about 50° C.

13. The method of claim 6 wherein said volatile boron fluoride contacting is conducted at a temperature of from about ambient to about 50° C.

* * * * *

UNITED STATES PATENT AND TRADEMARK OFFICE
CERTIFICATE OF CORRECTION

PATENT NO. : 4,427,786
DATED : January 24, 1984
INVENTOR(S) : Miale et al

It is certified that error appears in the above—identified patent and that said Letters Patent is hereby corrected as shown below:

Column 3, line 62, in the last ( ) of the equation, "$(C^-)_2$" should be --$(Cl^-)_2$--.

Column 3, line 63, in the last ( ) of the equation, "$(C^-)_2$" should be --$(Cl^-)_2$--.

Column 4, line 3, in the last ( ) of the equation, "$CL^-)_2$" should be --$(Cl^-)_2$--.

Signed and Sealed this

Tenth Day of July 1984

[SEAL]

Attest:

GERALD J. MOSSINGHOFF

Attesting Officer      Commissioner of Patents and Trademarks